March 2, 1971  M. A. COHLY  3,567,467
EDIBLE COLLAGEN CASING CONTAINING-ANTIOXIDANT
Filed Jan. 15, 1968  2 Sheets-Sheet 2

MAUJ A COHLY
INVENTOR.

his attorney

United States Patent Office 3,567,467
Patented Mar. 2, 1971

3,567,467
EDIBLE COLLAGEN CASING CONTAINING ANTIOXIDANT
Mauj A. Cohly, Catlin, Ill., assignor to Tee-Park, Inc.
Filed Jan. 15, 1968, Ser. No. 697,708
Int. Cl. C22c 13/00
U.S. Cl. 99—176                                    10 Claims

ABSTRACT OF THE DISCLOSURE

An edible sausage casing prepared from hide collagen having improved antioxidant and appearance characteristics, and the method of manufacture thereof. Animal hides are swollen and mechanically unhaired and split to produce a collagen containing corium layer. The corium is ground into fine particles, formed into a slurry and swollen with weak acid to produce an extrudable collagen paste or slurry having a solids content of about 2–6%. The slurry is extruded through an annular die, coagulated with ammonium sulfate or sodium sulfate and tanned or hardened in a bath containing any suitable nontoxic tanning agent such as aluminum salts, ferric salts, nontoxic dialdehydes, etc. The tanned casing is washed and finally plasticized using an aqueous solution of glycerin or equivalent plasticizer, containing a small amount of a monoglyceride or an acetylated monoglyceride, and an edible, nontoxic antioxidant. The casing is then dried and reeled and eventually shirred on a commercial shirring machine for delivery to the meat packer in shirred form. The final treatment of the casing, prior to drying, with the solution containing a small amount of an edible, nontoxic antioxidant, is effective to improve the antioxidant and appearance characteristics of the casing, particularly upon prolonged storage.

BACKGROUND OF THE INVENTION

Natural casings are prepared from the intestines of various edible animals, primarily cattle, hogs and sheep. The intenstines are removed from the slaughtered animal and are thoroughly cleaned by processes well known in the art. Natural casings which have been thoroughly cleaned, are stuffed with various sausage meat compositions and formed into sausage links in preparation for cooking. The sausages which are thus formed are cooked by the consumer and the sausage casings eaten with the cooked sausage. In the preparation of certain smoked or precooked sausages, such as frankfurters and the like, the sausage is cooked or smoked or otherwise processed by the meat packer to render it edible without further treatment by the consumer.

Prior to about 1925, substantially all sausage casings were natural casings prepared from animal intestines. Since that time there have been developed several types of synthetic sausage casings, principally of regenerated cellulose, which are used in the preparation of the major portion of sausages which are made and sold today. Cellulose casings are used in the preparation of large sausages such as bolognas, salamis, and the like, and are removed from the sausage by the consumer at the time of final preparation for eating. Regenerated cellulose casings are also used in the preparation of frankfurter sausages wherein the casing is stuffed with sausage emulsion, linked, smoked and cooked, and the casing removed from the finished sausage.

Regenerated cellulose casings have not proven satisfactory for the processing of pork sausage inasmuch as cellulose is not edible with the sausage and does not transmit the fat which is released from the sausage during cooking. As a result there has been some demand for an artificial sausage casing which is edible and which has the properties desired in a casing to be used in the processing of pork sausages.

Over a period of many years, synthetic sausage casings have been prepared from animal collagen. Casings made of collagen have been prepared by processing animal hide to break the collagen into a fibrous structure and extrude the collagen fibers in the form of a doughy mass to produce tubular casings. The casings which have been prepared in this manner have been hardened with formaldehyde and have been used as a removable casing for processing various sausages. These casings have not been edible even though collagen itself is an edible material. More recently, edible sausage casings of collagen have been prepared and sold in commercial quantities. In the manufacture of edible collagen casings, considerable emphasis has been placed on the necessity for using collagen source materials which have not been subjected to a liming treatment. In fact, a number of recent patents describing the production of collagen have indicated that it is absolutely necessary to start with an unlimed collagen source material if an edible casing is to be obtained. While the use of unlimed collagen as a starting material has certain advantages, it has the substantial disadvantage of requiring a more severe mechanical treatment for removal of hair and the epidermal layer from the hides from which the collagen is obtained.

In the co-pending patent application of Robert D. Talty and Mauj A. Cohly, Ser. No. 442,885, filed Mar. 26, 1965, now Pat. No. 3,408,918 a process is described in which edible collagen casings are prepared from limed hide collagen. In that process, animal collagen is obtained from limed hides which are subsequently subjected to an acid deliming process. In the copending patent application of Robert D. Talty, Ser. No. 471,645, filed Sept. 13, 1965, now Pat. No. 3,425,846 a process is described for the preparation of edible collagen casings from limed hides which may be subjected to an acid deliming process or which may be converted directly into a collagen paste, and casings formed without the acid deliming step, provided that the collagen is processed into casing at a sufficiently high speed. In the copending patent application of Mauj A. Cohly and James W. Sanner, Ser. No. 675,246, filed Oct. 13, 1967, a process is described wherein the plasticizing bath contains a small amount of a monoglyceride or an acetylated monoglyceride to improve the elasticity and feel of the casing.

In the preparation of edible collagen casings, hide collagen is converted into a finely divided fibrillar form and extruded in the form of a dilute collagen slurry, e.g., 2–6% collagen content. The extruded collagen is then passed into an ammonium sulfate and/or sodium sulfate coagulating bath which dehydrates the collagen slurry and forms a coherent collagen film. At this stage in the process, however, the salt-coagulated collagen film can be handled but will revert to a thin slurry upon further contact with water. It is therefore necessary to harden or tan the extruded collagen film to permit further processing of the film and to improve the film with sufficient strength for use as a sausage casing.

A satisfactory tanning process must utilize a tanning agent which is very rapid in tanning action and completely nontoxic in the form in which it is present in the finished casing, and must produce a casing of sufficient strength to be stuffed with sausage meat, linked, packaged, and finally cooked. In the preparation of edible collagen casings, one satisfactory method of tanning involves the use of a bath containing an aluminum salt complex, such as a citrate complex, at a pH suitable for tanning. Also, collagen casings may be tanned by treatment with various iron salts or by treatment with nontoxic dialdehydes such as glutaraldehyde. When the casings are tanned or hardened, the tanned casing is generally quite strong and easy to handle during subsequent processing (washing, plasticizing and drying), reeling, shirring, packaging, etc. Casings which are shirred and packaged satisfactorily may be wholesome initially, but may often become rancid by oxidation upon storage. As a result, there has been a need for a treatment of collagen casings to improve its antioxidant properties.

The importance of preserving the wholesomeness of collagen sausage casings is obvious. The importance of keeping the collagen sausage casing wholesome and palatable is especially important when storage is necessary. Stabilization of collagen casings to oxidation has been attempted by several means, such as choice of raw materials, proper packaging, deodorization, and exercising every precaution during processing to avoid unnecessary exposure to heat and light, or contamination with oxidation promoters. All of these methods have their limitations in that their applications are not always feasible for collagen sausage casings; hence the stabilization of collagen casings may be improved by use of antioxidants. By the addition of traces of certain chemicals, it has been found that oxidative degradation can be inhibited and the age resistance of collagen casings considerably increased.

Antioxidants are chemical preservatives and come under the terms of the Federal Food, Drug and Cosmetic Act when they are present in the food shipped in interstate commerce.

It is essential that the antioxidant chosen should protect both the collagen itself and the glycerin plasticized in the casing during storage. Furthermore, the antioxidant must be capable of uniform distribution in the collagen casing. It is also noted that the fact that an antioxidant may be successful in protecting the casing from rancidity does not mean that it will also retard oxidative discoloration

STATEMENT OF OBJECTS AND FEATURES OF THE INVENTION

It is therefore one object of this invention to provide a new and improved process for the preparation of edible collagen casings from limed or unlimed hides utilizing a novel antioxidative treatment.

Another object of this invention is to provide new and improved antioxidant additives for edible collagen casings which can be conviently be added to the collagen casings after the collagen is extruded.

Yet another object of this invention is to provide edible collagen casings containing food and drug approved antioxidants.

A feature of this invention is the use of new and improved antioxidants for preventing the oxidation of edible collagen casings.

Another feature of this invention is the use of food and drug approved edible, nontoxic antioxidants in edible collagen casings.

Yet another feature of this invention is the use of antioxidants for edible collagen casings which can be incorporated into the collagen casings as an after-treatment subsequent to extrusion.

Other objects and features of this invention will become apparent from time to time throughout the specification and claims as hereinafter related.

SUMMARY OF THE INVENTION

In a commercially preferred collagen casing manufacturing operation, limed cowhide splits are employed as the starting material. The splits are converted into an extrudable slurry through a series of steps in which the cowhide is chopped into strips, ground up, acid-swelled, homogenized, filtered and deaerated. The resulting slurry is then extruded through an annular die, coagulated, plasticized and dried.

In accordance with this invention, it has been discovered that edible collagen casings (prepared using either limed or unlimed hides as a source of collagen) having improved antioxidant properties may be prepared by the incorporation in or on the casings of certain edible, nontoxic antioxidants. The antioxidant is preferably incorporated into (or on) the sausage casings at dilutions in the range of 1 to 2800 up to 1 to 1400 in the final plasticizing bath. The antioxidants employed are certain food grade proprietary products. The antioxidants imparts a sheen to the finished casing as well as rendering the casing free from unpleasant odors due to microbial growth and glycerin oxidation over extended periods.

BRIEF DESCRIPTION OF THE DRAWINGS

The process for the preparation of casings in accordance with this invention will be understood more fully by reference to the following description and the accompanying drawings, in which.

DESCRIPTION OF THE PREFERRED EMBODIMENTS

Figure 1:
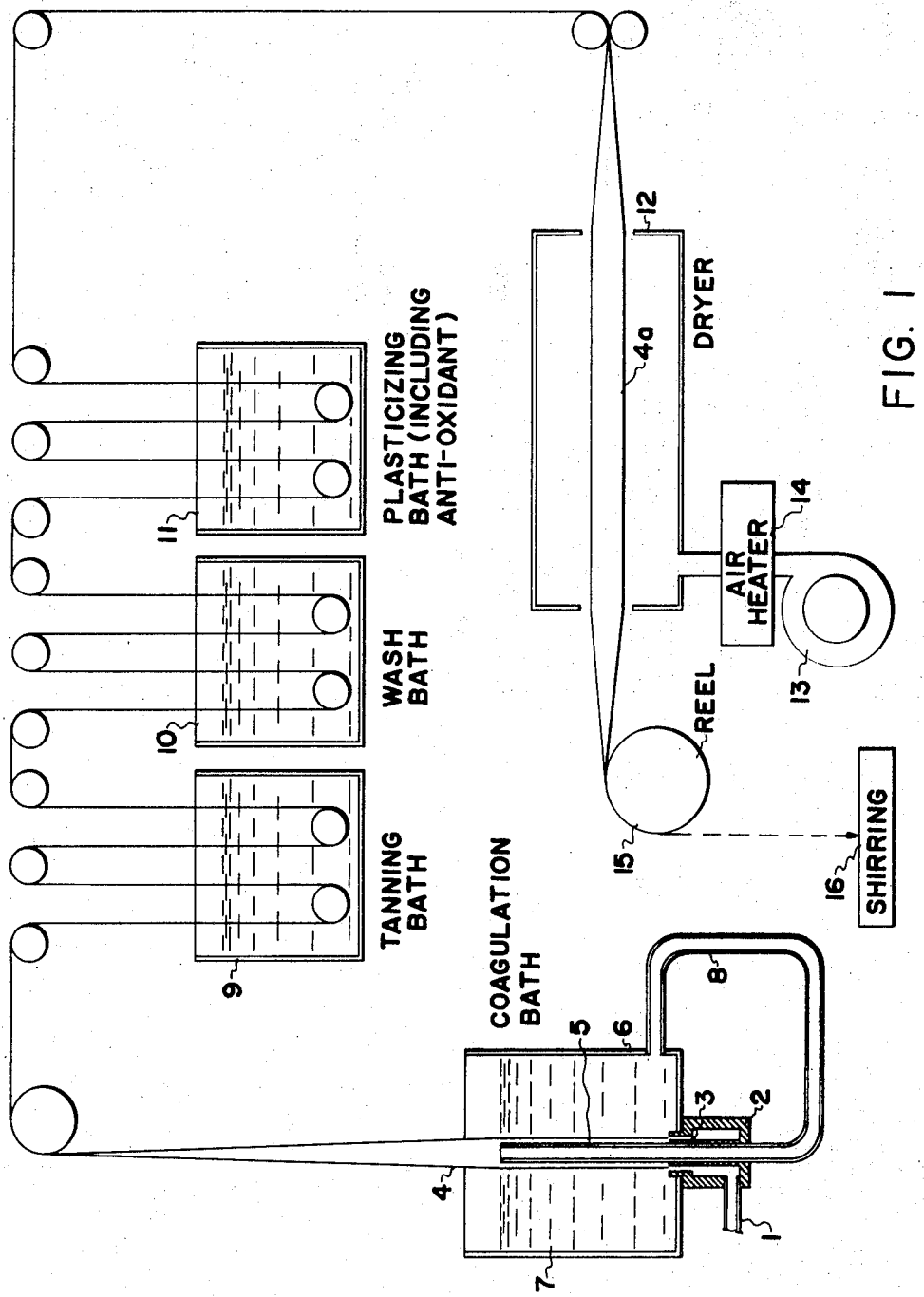
FIG. 1 is a flow diagram illustrating schematically the important steps in the extrusion, tanning, plasticizing, softening and drying of edible collagen casings.

Collagen tissues which are suitable for preparation of extruded collagen casings are obtainable from hide and tendon, although hide collagen is preferred for casing manufacture. Collagen is formed of a large number of fibers which in turn consist of a much greater number of fibrils of submicroscopic size. Collagen fibrils have a diameter of the order of 10–50 angstroms and lengths ranging from several thousand up to several million angstroms. Recent patents describing the production of edible collagen casings have emphasized the necessity of using collagen source materials which have not been subjected to a liming treatment for the reason that the liming treatment allegedly prevents the bursting of the collagen fibers to release the fibrils which is necessary for the formation of fibrillar films. More recently, it has been found that satisfactory edible collagen casings can be prepared using either limed or unlimed collagen as the source material for the preparation of casing.

If unlimed collagen is to be used in the preparation of an edible collagen casing, the unlimed hide, either fresh, frozen, or salt-cured, is defleshed and the hair and the epidermal layer mechanically removed, e.g., by abrading, scraping, splitting, etc. Enzymatic dehairing of the hide may also be used if desired. The hide is next cut into small pieces and passed through a meat grinder until reduced to a very small size. The ground collagen is then swollen in a solution of an organic acid such as lactic acid or citric acid to produce a slurry having a collagen content in the range from about 2–6%, preferably about 3.5–5%.

The collagen slurry is extruded through an annular die into a coagulating bath consisting of concentrated aqueous sodium sulfate or ammonium sulfate solution. The slurry is preferably passed through a die having counter rotating parts at the annular opening to orient the collagen fibers and fibrils in opposite directions on the outer and inner portion of the extruded tube to provide a tubular casing of improved strength. The resulting tubular collagen film or casing is then passed into a hardening or tanning bath, preferably consisting of a ferric or aluminum salt in an olated form, an edible aldehyde, vegetable tannin such as tannic acid, or the like. The tanned or hardened casing is then washed, plasticized, dried, shirred, and packaged.

If the collagen to be used in the preparation of an edible casing is derived from limed animal hides, some variation in the above-noted procedure is required. An animal hide is treated to remove the blood quickly and cut into suitable pieces (hide trimmings may also be used) for the subsequent liming treatment. The hide pieces are treated with a suitable lime solution for removal of hair. The lime solution may be simply a saturated solution of lime containing excess solid lime, or may be a solution containing excess solid lime together with sodium sulfhydrate and/or dimethylamine sulfate, or other promoters for the depilation of hair. After treatment in a liming solution for a period less than two days (3–12 hours or less is preferred), the hides are removed and washed. After washing, the hides are split or otherwise mechanically abraded to remove the epidermal layer and any remaining hair. If desired, the hides may be neutralized by treatment with a nontoxic acid, such as lactic acid, at a pH of 2.5–6.5, to form soluble calcium salts. The neutralized hide is washed sufficiently to remove most of the by-product salts. The hide may be split or mechanically dehaired to remove residual hair and the epidermal layer either before or after the neutralization step. The defleshed and neutralized hide split or corium layer is then cut into small pieces and ground at a temperature less than about 20° C. into a finely divided form, and mixed with sufficient water to produce a slurry having a collagen content in the range from about 2–6%, preferably about 3.5–5%.

The collagen slurry which results from the aforementioned treatment is then mixed with a weak acid such as citric acid or lactic acid to cause the collagen fibers to swell and burst, thus releasing the collagen fibrils and destroying essentially the identity of the individual fibers. The best results are obtained by carrying out the washing, dehairing, grinding and acid swelling of the collagen in less than 48 hours and preferably less than about 12 hours.

The swollen collagen slurry is then extruded through an annular die to produce a thin-walled product for use as sausage casings after tanning and further processing. In order to obtain maximum strength in the product casing, the collagen slurry is preferably extruded through a die having counter-rotating inner and/or parts, which is well known in the prior art in the preparation of collagen casings, as shown in Becker U.S. Pat. 2,046,541.

Figure 2:
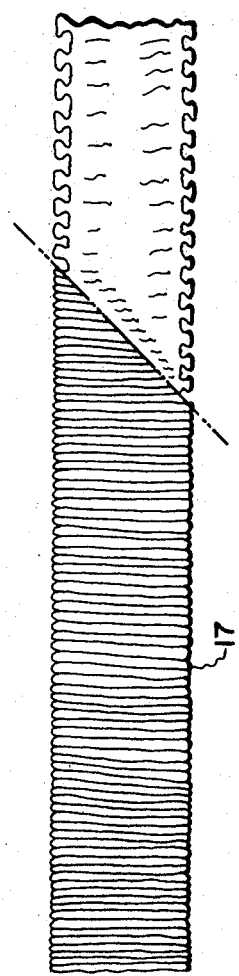
FIG. 2 is an extruded edible collagen casing prepared in accordance with this invention as processed in a shirred form and, FIG. 3 is a schematic view showing the filling of the casing with sausage meat on an extrusion horn or nozzle and the preparation of sausage links therefrom.

The collagen slurry is extruded through the die into a coagulating bath consisting of a concentrated solution of sodium sulfate or ammonium sulfate. The thin-wall collagen tube which is formed in the coagulating bath is then passed into a tanning or hardening bath, viz., a solution of a ferric salt or an aluminum salt, preferably in an olated form, edible aldehyde, vegetable tannin, or the like, and is subsequently washed and plasticized. The casing which is thus prepared is inflated with air or other gas and passed through a dryer. From the dryer, the casing is either rolled up on reels or is passed on to the shirring machine where it is shirred into short strands as illustrated in FIG. 2 of the drawings. The casing may be shirred directly from the dryer but this is not generally done inasmuch as the shirring machines operate at a much higher speed than the extrusion rate in the process. The casing is preferably stored on reels and then fed separately to shirring machines of the type generally used in the shirring of cellulosic sausage casings. Typical shirring machines are shown in U.S. Pats. 2,722,714; 2,722,715; 2,723,201 and 3,122,517.

In both of the procedures described above for preparing edible collagen casing, whether from limed or unlimed hides, the final step in the preparation of the casing prior to drying involves passing the extruded, coagulated, tanned, and washed casing through a plasticizing bath. The plasticizing bath is preferably an aqueous solution of glycerin or similar plasticizing material (e.g., sorbitol, dipropylene glycol or triethylene glycol) and preferably contains a softening agent emulsified therein. The softening agent used in the plasticizing bath consists of about 0.5–5.0% wt. of a fatty monoglyceride or an acetylated fatty monoglyceride. The softening agent is emulsified in the aqueous glycerin solution using a suitable emulsifying agent such as sodium dodecyl sulfate or polyoxyethylene (20) sorbitan monopalmitate, or the like. The emulsifier is preferably used at a concentration of about 10% by weight of the fatty monoglyceride or acetylated fatty monoglyceride. The monoglycerides which are used are fatty monoglycerides, such as glycerol monostearate, glycerol mono-oleate, glycerol monopalmitate, glycerol monolaurate, etc., which are sold under the trade name. Myverol. Acetylated monoglycerides which may be used are the monoacetate and diacetate derivatives of the aforementioned fatty monoglycerides such as glycerol monostearate diacetate, glycerol monostearate monoacetate, glycerol mono-oleate diacetate, glycerol monopalmitate diacetate, etc., which are sold under the tradename Myvacet.

In accordance with this invention, an edible, nontoxic Food and Drug approved antioxidant is incorporated in small quantities in the final plasticizing bath. Generally, a dilution of about 1 to 1400 or 1 to 2800 (by weight) is sufficient to render the casing free from unpleasant odors due to microbial growth or glycerin oxidation over extended periods of storage.

During an experimental antioxidant test with edible collagen casings, it was noticed that antioxidant-treated collagen casing had much more sheen than the same casing not treated with antioxidant. This increased sheen or bloom is particularly noticeable when the casing was stuffed with pork sausage or frankfurter emulsion.

In FIG. 1 of the drawings, the steps from extrusion through reeling or shirring are illustrated schematically in slightly more detail. The collagen slurry is introduced through inlet conduit 1 into die 2 having an annular die outlet 3 through which casing 4 is extruded. The die 2 has an inner tube 5 which extends upwardly within the extruded casing to remove coagulating bath from within the casing. The die 2 is located at the bottom of container 6 which contains a coagulating bath 7. Coagulating bath 7 is circulated through conduit 8 from tube 5 for removal of the coagulating bath from inside the extruded casing. Casing 4 which is coagulated in bath 7 passes over a series of rollers and is directed through a tanning bath 9.

Tanning bath 9 consists of an aqueous solution of any suitable nontoxic tanning agent (e.g., vegetable tannins, nontoxic edible dialdehydes such as glutaraldehyde, and the aldehydes present in smoke condensates, and aluminum and ferric salts, preferably in olated form and rendered partially basic).

From tanning bath 9, the casing passes through a wash bath 10 where unreacted tanning agent is washed out of the casing. The casing is then passed through plasticizing and antioxidant bath 11 which introduces a small amount of a plasticizer such as glycerin, a softening agent such as fatty monoglyceride or an acetylated fatty monoglyceride, and an edible, nontoxic F.D.A. approved antioxidant into the casing. From the plasticizing and antioxidant bath 11, the casing passes through dryer 12 where it is inflated as indicated at 4A and dried with air or other gas circulated by fan or blower 13 through air heater 14.

After leaving dryer 12, the casing may be collapsed and rolled up on reel 15 from which it is subsequently removed for shirring. In an alternate embodiment of this process, the casing may be passed directly to a shirring machine shown diagrammatically as 16. In either case, the shirring machine which is used for preparation of shirred strands of casing may be of any suitable type such as the types commonly used in the shirring of regenerated cellulose sausage casings as noted above.

Figure 3:
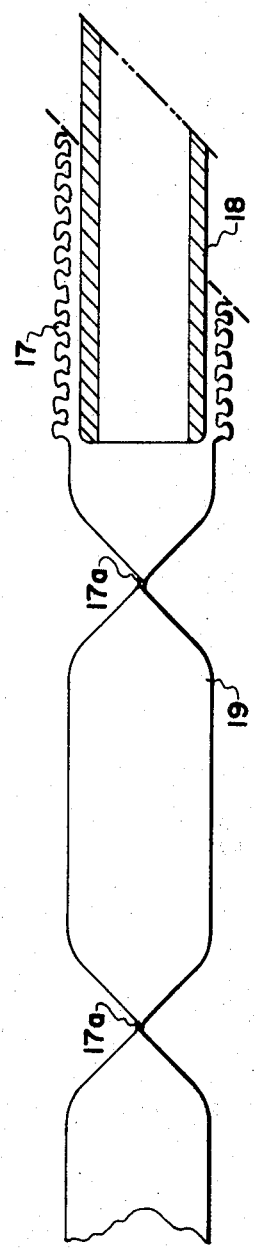

After the casing is shirred into individual short strands for convenience of handling, it is packaged for shipment to the meat packer. Sometimes it may be desired to cure the casing by heating at 60–80° C. in an atmosphere of 20–50% relative humidity for several hours prior to shipment. In FIG. 3 the stuffing of the casing is illustrated. A strand of edible collagen casing 17, also shown in detail in FIG. 2, is placed on a tubular stuffing horn 18 which is connected to a pressurized source of sausage emulsion (not shown). The sausage emulsion is passed through the stuffing horn 18 into the end of casing 17 and the casing is filled with sausage meat and twisted at suitable intervals, as indicated at 17A, to provide sausage links 19. The links may be severed from each other and packaged in a suitable overwrap following conventional meat packaging techniques. When the sausage is cooked by the consumer, the casing is found to be quite strong and shrinks with the meat during cooking. The casing may be prestuck, if desired, to permit more rapid release of the fat during the cooking of the sausages. The casing which is prepared in this manner and treated with the plasticizer, antioxidant and (optionally) softening agent in the plasticizing and antioxidant bath is superior in antioxidative and appearance properties, particularly upon extended storage.

The following nonlimiting examples are illustrative of the application of this invention to the preparation of a satisfactory edible collagen casing having improved antioxidative and appearance characteristics.

EXAMPLE 1

In this example, the preparation of edible collagen casings from limed animal hides is illustrated using a plasticizing and antioxidant final treatment to produce a casing having improved antioxidative and appearance characteristics.

Selected cattle hides from carcasses certified fit for human consumption, weighing about 65–75 lbs. each, are the starting material for this process. As soon as possible after flaying and inspection, the hides are washed in a large volume of circulating cool (10° C.) water to remove adhering blood. After washing, the hides are fleshed fresh, without curing, to remove adhering fatty and muscular debris from the flaying operation.

The washed and fleshed hides are then treated in a liming bath containing 6% wt. of fresh calcium hydroxide and 1.5% wt. sodium sulfhydrate (the liming bath may contain up to 3% dimethylamine sulfate), as solution and/or slurry contained in about 450% wt. of water at room temperature (15–20° C.), all percentages being calculated on the weight of the hide treated. The treatment is carried out for a period less than about 6 hours, sufficient to remove most of the hair from the hide, and the hides are gently agitated from time to time to insure even penetration of the liming liquor.

After liming, the hides are removed from the liming bath and permitted to drain for a period of one-half hour while suspended. The limed hides are then gently squeezed, as between rubber rollers, to remove excess liming liquor. The hides which have been thus limed, drained, and squeezed are then cut or split in the plane of the hide into two approximately equal portions by weight. The upper or outer hide surface contains all of the hair, hair follicles, and sebaceous and sudorific glands. The inner or corium layer consists essentially of collagen. The outer or hair-containing layer or split is discarded as unsuitable for use in the preparation of casing but may be used for the formation of leather laminates or coverings.

The corium layer or split is then placed in a tank or vat containing about 4.5 times the hide weight of water at a solution less than about 15° C. Gentle agitation is used to insure even removal of debris and adhering lime solution and/or slurry. The hides are washed during a period of 20–30 minutes. The washings are removed and the corium splits resuspended in 4.5 times their weight of cool (15° C.) water. Edible grade lactic acid, suitably diluted at a concentration of 2–4 ounces of 44% lactic acid per quart of cool (15° C.) water, is added in small portions at 15 minute intervals, with gentle agitation for 5 minutes of each 15 minute period. The liquor is tested for pH before each addition, and the end point is regarded as the point when the pH is permanently depressed below 7.0. In general, this requires about 1.5% of the 44% lactic acid, based on the weight of the corium splits. This treatment is effective to neutralize the excess lime in the corium layer and to remove it as a soluble salt. The rate of addition of the lactic acid solution is carefully regulated so that the temperature of the bath is never permitted to rise above about 32° C.

The neutralized and delimed corium splits are then removed from the neutralization bath, drained, and rinsed in cool (15° C.) water, packed into polyethylene bags to chill the prepared collagen and to maintain it below 5° C. during storage and/or shipment prior to comminution and acid swelling operations. It should be noted, however, that the hides may, if desired, be cut into small pieces, or small pieces of scrap hide material may be used in the steps of liming, splitting and neutralization or deliming.

The delimed corium splits are cut into small square or rectangular sections, e.g., ¼ to 4 inches on a side, in preparation for grinding. The small pieces of treated hide are converted to a fine pulp by successive passes through a meat grinder. In this grinding operation, sufficient ice is mixed with the hide splits to maintain the temperature below about 20° C. (and preferably below about 10° C.). Successive passes through the meat grinder use successively small dies, the smallest being about ⁹⁄₆₄ inch. At this point, the mixture is adjusted in water content by addition of sufficient water to bring the water content of the slurry to about 90%.

The collagen slurry or pulp is then treated with sufficient dilute lactic acid (other dilute or weak acids such as citric or acetic acid may be used) to produce a pH of about 2.5–3.7. The acid is usually added as a dilute solution, e.g., about 0.8–2.0%. After thorough mixing, the pulp and acid are stored overnight at a temperature of about 3° C. to swell. At the end of this time the collagen is swollen and has taken up all of the water in the slurry. The swollen collagen is then mixed with sufficient water and acid to maintain the pH of 2.5–3.7, thus producing a thin, homogeneous paste consisting of about 4% collagen and 1.2% lactic acid.

The swollen collagen slurry is passed through a homogenizer to further disperse the fibers and then is filtered to remove any undispersed fiber clumps or other solid contaminants. The paste is generally deaerated by storage under vacuum prior to extrusion. The process, from the washing of the limed hide through the acid swelling of the comminuted collagen, is preferably carried out in a period of about 6–12 hours, and generally no longer than 48 hours.

The homogenized and filtered collagen slurry is then pumped under pressure through the extrusion die, as previously described, into a coagulating bath consisting of about 40% ammonium sulfate (sodium sulfate can also be used) in water. When the collagen is extruded as a thin-walled tube into this concentration of ammonium sulfate, the collagen fibrils are dehydrated and collapse to form a film which is sufficiently coherent for further processing. As shown in FIG. 2 of the drawings, the coagulation bath is circulated both inside and outside the tube to maintain the tube in an inflated condition and to insure proper coagulation of the casing both on the inside and the outside.

After the film is coagulated in the ammonium sulfate solution, it is necessary to tan the film to give it sufficient strength for further processing and for stuffing with sausage meat. If the film were taken from the ammonium sulfate coagulating bath and dried, it would be a film of moderate dry strength but would revert to a paste upon contact with water. It is therefore necessary for the casing to be tanned or hardened to provide the wet and dry strength required in an adible casing.

From the coagulation bath, the casing next passes into a first tanning bath which comprises a solution containing 10–20% of aluminum sulfate, $Al_2(SO_4)_3 \cdot 18H_2O$, 3–7% sodium citrate (or an equivalent amount of citric acid) and 3–7% sodium carbonate. The tanning bath is formulated so that the sodium citrate or citric acid forms a complex with the aluminum sulfate, and the sodium carbonate neutralizes a portion of the aluminum-citrate complex to render the same about ⅓ to ⅔ basic. This results in a tanning bath having a pH about 4.0 and permits the use of aluminum concentrations for tanning which are many times the concentrations available with other aluminum tanning baths, such as alum tanning baths. A suitable tanning bath may similarly be made from ferric salts by formation of a citrate complex and partially neutralizing the complex with sodium carbonate or other weak alkali to convert the complex to an olated form.

After the casing is thoroughly tanned it is passed through one or more wash baths to wash out any unreacted tanning or hardening reagent. The casing is then passed through a plasticizing and antioxidant bath consisting of a dispersion or solution of an edible, nontoxic antioxidant in an aqueous solution of glycerin (or equivalent plasticizer such as sorbitol, dipropylene glycol, triethylene glycol, etc.). The plasticizing and antioxidant bath (which is preferably also a fat liquoring bath) has a small amount of antioxidant therein and introduces a substantial amount of the desired plasticizer, softening agent and antioxidant into the casing, which prevents the casing from becoming rancid and discolored after drying, particularly upon storage, and which gives the casing improved sheen characteristics. The plasticizing and antioxidant bath preferably also contains about 0.5–5.0% of Myvacet (type 9–40) which is a diacetylated derivative of glycerol monostearate, and is emulsified into the glycerin solution with about 10% sodium dodecyl sulfate based on the weight of Myvacet added.

The antioxidant is present in this final plasticizing bath in small amounts, generally in a dilution of about 1 to 1400 or 1 to 2800 (by weight). This generally provides a finished casing having less than about 0.01% by weight of antioxidant (in the casing). If the casing has more of a concentration of antioxidant therein, the plasticizing bath is made more dilute in antioxidant to bring the concentration thereof in the final casing within the desired upper limit.

Satisfactory antioxidants are Aranox 7G, Aranox NE and Aranox 4E. Aranox is a trademark of Reheis Chemical Company (Kankakee, Ill.), Division of Armour Pharmaceutical Company of Chicago, Ill. Aranox 7G is a proprietary antioxidant having the following composition (by weight):

Butylated hydroxyanisole—28.0%.
Propylgallate—12.0%.
Citric acid—6.0%.
Base (aqueous)—quantity sufficient to neutralize.

Aranox NE is a proprietary antioxant having the following composition:

Butylated hydroxyanisole—40.0%.
Nordihydroguaiaretic acid—4.0%.
Citric acid—6.0%.
Base (aqueous)—quantity sufficient to neutralize.

Aranox 4E is a proprietary antioxidant having the following composition:

Butylated hydroxyanisole—13.3%.
Butylated hydroxytoluene—13.3%.
Citric acid—5.0%.
Base (aqueous)—quantity sufficient to neutralize.

Butylated hydroxyanisole is predominately 3-tert-butyl-4-hydroxyanisole, with varying amounts of 2-tert-butyl-4-hydroxyanisole:

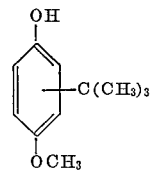

Butylated hydroxytoluene is 2,6-di-tert-butyl-p-cresol:

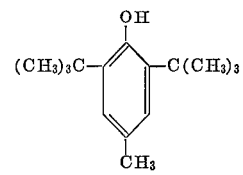

In successive experiments each of the three Aranox compositions was used as the antioxidant (1 to 1400 dilution).

The collagen casing is passed into the plasticizing and antioxidant bath prior to the drying and, by a system of multiple passes, maintained in the bath for a time ranging from 3–10 minutes. After the casing leaves the plasticizing and antioxidant bath it is dried, as described above, and shirred and packaged. The finished casing possesses a fine transparency and sheen, and passes rancidity and discloration tests, particularly upon extended storage. In particular, it has no odor after one month of storage and no off-color such as brown or yellow. Furthermore, the casing has an excellent frying response, e.g., no splitting of the casing upon frying. In particular, Aranox 7G appeared to be the best antioxidant.

EXAMPLE 2

This example illustrates the use of a combination of anionic detergents in preparing the plasticizing and antioxidant bath to produce a casing which is free from tackiness which is sometimes encountered in the casing during stuffing and linking. The casing is prepared as described in Example 1 or as described in any of the alternate processes for casing manufacture described generally above. In this example, however, the makeup of the plasticizing and antioxidant bath (of the experiment for each antioxidant) is modified slightly. The plasticizing and antioxidant bath contains sufficient glycerin to plasticize the casing and has 0.5–5.0% Myvacet (type 9–40) emulsified into the bath using 0.05–0.5% sodium dodecyl sulfate and 0.005–0.10% calcium stearate. The collagen casing is processed in this bath as described in Example 1 (using each of the three proprietary Aranox antioxidants in successive experiments) and the finished casing is found to be free from odors and discoloration often encountered upon storage, and gives excellent frying response. The casing is both shiny and transparent.

EXAMPLE 3

In this example, the process described in Example 2 is repeated except that a non-ionic detergent is substituted in emulsifying the Myvacet into the plasticizing and antioxidant bath (Aranox 76, 1 to 2800 dilution). Tween 20, sorbitan polyoxyethylene, (20) monopalmitate, is employed as the emulsifying agent at a concentration of 0.05–0.5% in preparing a bath containing 0.5–5.0% Myvacet. The casing is processed in a manner described in Examples 1 and 2, and after drying has a high sheen and transparency. The casing prepared using this plasticizing bath is free from odor and discolors upon storage, and has excellent response to frying.

EXAMPLE 4

In this example, the procedure described in Examples 1 and 2 is repeated except for a modification in the softeners added in the plasticizing and antioxidant bath (Aranox 7E, 1 to 2800 dilution). The glycerin solution, 2% Myvacet (type 9–40) and 0.02% Myverol (type 18–8, glycerol monostearate) are emulsified into the bath with 0.07% sodium stearate. The concentration of Myverol and sodium stearate in relation to the Myvacet may be varied depending upon the degree of dispersion desired.

The collagen casing was prepared as described in Examples 1 or 2 and passed through the bath for a period of 3–10 minutes. After drying, shirring and packaging, the resulting casing was found to have superior transparency, sheen and frying properties, and to be free from odor and discolor upon storage.

EXAMPLE 5

In this example, the Myvacet was emulsified into the glycerol solution using a combination of anionic and non-ionic detergents. Myvacet was emulsified in the presence of sodium dodecyl sulfate Tween 80 (sorbitan polyoxyethylene (80) monopalmitate). Myvacet (type 9–40) was added to the glycerol solution in the proportion of 2–5% in admixture with 0.05–5.0% sodium dodecyl sulfate and 0.2–0.5% Tween 80 and Aranox 4E (1 to 1400 dilution).

The emulsion was employed to render collagen casing resistant to oxidation in the manner described in the previous examples. After drying, shirring and packaging, the finished casing is transparent and shiny, and gives excellent frying response. Upon storage, no odor or discolor develops.

EXAMPLE 6

In this example, Myvacet and Myverol were emulsified into the plasticizing and antioxidant bath, as described in Example 4, using sodium dodecyl sulfate as the emulsifying agent. The Myvacet and Myverol were emulsified uniformly in the glycerol solution with Aranox 7E antioxidant (1 to 2800 dilution) and provided a satisfactory solution for treating the collagen casing.

The collagen casing was processed as described in any of previous examples by passing through the pasticizing and antioxidant bath in a multipass arrangement allowing a 3–10 minute residence time in the bath. After treatment, the casing was dried, reeled, shirred and packaged. The finished casing gives good odor and color performance upon storage. It is transparent and shiny, and shows excellent frying response.

The examples set forth above are concerned primarily with the variation in techniques of preparation of the combined plasticizing and antioxidant bath. It should be understood that casing prepared by any of the processes described in the introduction to this specification may be treated in the combined plasticizing and antioxidant bath described in any of the examples to produce a finished casing having the desired, improved visual, odorific and frying properties. The properties result primarily from the plasticizing and antioxidant treatment and are obtained regardless of whether the casing is derived from limed or unlimed hides and regardless of the particular coagulating or tanning system used.

Although it is not desired to be limited by any particular theory of the invention, it is believed that the superior antioxidant activity of Aranox antioxidants is due to the built-in chelating agent therein which prevents metal (e.g., iron and copper) catalysis of oxidative changes. Maximum antioxidative protection is obtained thereby. The Aranox antioxidants, because they are oil soluble, water miscible bases, allow easy compounding with the final plasticizing bath. The Aranox antioxidants also provide a synergistic antioxidative effect.

While this invention has been described fully and completely with special emphasis upon several preferred embodiments, it should be understood that within the scope of the appended claims the invention may be practiced otherwise than as specifically described herein.

I claim:
1. A method of preparing an edible tubular collagen casing which comprises
  treating a fresh or frozen or salt-cured animal hide, either limed or unlimed, to remove the epidermal layer and hair therefrom,
  grinding the hide at a temperature less than about 20° C. to produce a slurry of finely divided collagen in water,
  treating the slurry with acid at pH of 2.5–3.7 to swell the collagen,
  extruding the slurry through an annular die to form a collagen tube,
  immersing the extruded tube in a coagulating bath,
  tanning the collagen tube,
  washing the tube to remove unreacted coagulating and tanning materials,
  passing the tanned and washed tube through a plasticizing and antioxidant bath comprising an aqueous solution of glycerin, sorbitol, dipropylene glycol, or triethylene glycol, containing an edible, nontoxic, water soluble antioxidant comprising butylated hydroxyanisole, butylated hydroxytoluene, nordihydroguaiaretic acid, or propylgallate, and
  drying the tube to produce a nonfibrous edible casing, the concentration of said antioxidant in said plasticizing bath and the residence time of said tanned and washed tube in said plasticizing bath being such that an amount of said antioxidant not exceeding about 0.01% by weight of said casing is distributed substantially uniformly throughout said dried casing and said dried casing displays increased sheen and odor and color stability.

2. A method as defined in claim 1 in which said antioxidant comprises butylated hydroxyanisole or butylated hydroxytoluene.

3. A method as defined in claim 2 in which said antioxidant additionally includes citric acid.

4. A method as defined in claim 3 in which said antioxidant additionally includes propylgallate or nordihydroguaiaretic acid.

5. A method as defined in claim 1 in which said antioxidant is present in the concentration of about 1 part to 1400 to about 1 part to 2800 by weight in said plasticizing bath.

6. An edible extruded collagen casing comprising collagen fibrils, said casing having distributed substantially uniformly there throughout an amount, not exceeding about 0.01% by weight of said casing, of an edible, nontoxic, water soluble antioxidant effective to impart increased sheen and odor and color stability to said casing, said antioxidant comprising butylated hydroxyanisole, butylated hydroxytoluene, nordihydroguaiaretic acid or propylgallate.

7. The collagen casing of claim 6 in a shirred condition.

8. The casing of claim 6 wherein said antioxidant comprises butylated hydroxyanisole or butylated hydroxytoluene.

9. The casing of claim 8 wherein said antioxidant additionally includes citric acid.

10. The casing of claim 9 wherein said antioxidant additionally includes propylgallate or nordihydroguaiaretic acid.

References Cited

UNITED STATES PATENTS

| | | | |
|---|---|---|---|
| 2,979,410 | 4/1961 | Parlour | 99—175X |
| 3,151,990 | 10/1964 | McKnight | 99—176 |
| 3,123,480 | 3/1964 | Lieberman | 99—175X |
| 3,373,046 | 3/1968 | Fagan | 99—175 |
| 3,408,918 | 11/1968 | Talm | 99—176 |
| 3,361,577 | 1/1968 | Sinon | 99—176 |
| 3,451,827 | 6/1969 | Bridgeford | 99—176 |

OTHER REFERENCES

Bailey's Industrial Oil and Fat Products, Interscience Publishers, N.Y., 1964.

FRANK W. LUTTER, Primary Examiner

R. HALPER, Assistant Examiner